United States Patent
Zeller et al.

(10) Patent No.: US 10,036,468 B2
(45) Date of Patent: Jul. 31, 2018

(54) HYDRAULIC CONTROL SYSTEM

(71) Applicant: ZF Friedrichshafen AG, Friedrichshafen (DE)

(72) Inventors: Werner Zeller, Friedrichshafen (DE); Hans-Joachim Martin, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 109 days.

(21) Appl. No.: 15/149,778

(22) Filed: May 9, 2016

(65) Prior Publication Data

US 2016/0341306 A1    Nov. 24, 2016

(30) Foreign Application Priority Data

May 20, 2015 (DE) ......................... 10 2015 209 208

(51) Int. Cl.
  *F16K 11/20*  (2006.01)
  *F16H 61/00*  (2006.01)
  *F15B 13/08*  (2006.01)

(52) U.S. Cl.
  CPC ....... F16H 61/0009 (2013.01); F15B 13/081 (2013.01)

(58) Field of Classification Search
  CPC ................... F16H 61/0009; Y10T 137/85939
  USPC ................................. 137/493, 561 A, 597
  See application file for complete search history.

(56) References Cited

U.S. PATENT DOCUMENTS

| | | | | |
|---|---|---|---|---|
| 3,526,391 | A  * | 9/1970 | Church, Jr. ........... | B01F 5/0604 366/340 |
| 5,630,492 | A  * | 5/1997 | Yoshikawa ......... | F16D 25/0638 192/106 F |
| 7,878,705 | B2 * | 2/2011 | Schauerte ............. | B01F 5/0646 366/337 |
| 2003/0131684 | A1* | 7/2003 | Hori ...................... | F16H 57/043 74/606 R |
| 2016/0273655 | A1* | 9/2016 | Schoellhammer ... | F16J 15/0818 |

FOREIGN PATENT DOCUMENTS

| | | |
|---|---|---|
| DE | 102007019946 A1 | 10/2008 |
| DE | 102012213138 A1 | 2/2013 |
| DE | 202013010604 U1 | 11/2014 |

OTHER PUBLICATIONS

German Search Report DE102015209208.9, dated Feb. 8, 2016. (7 pages).

* cited by examiner

*Primary Examiner* — Reinaldo Sanchez-Medina
(74) *Attorney, Agent, or Firm* — Dority & Manning, P.A.

(57) ABSTRACT

A hydraulic control unit for a transmission includes a lower side housing, an upper side housing and an intermediate plate. The lower side housing and the upper side housing form a hydraulic supply channel section, which is connected in the intermediate plate by an aperture. At the inlet of the aperture, at least one recess with a predetermined depth is provided for bounding an inlet cross-section.

9 Claims, 2 Drawing Sheets

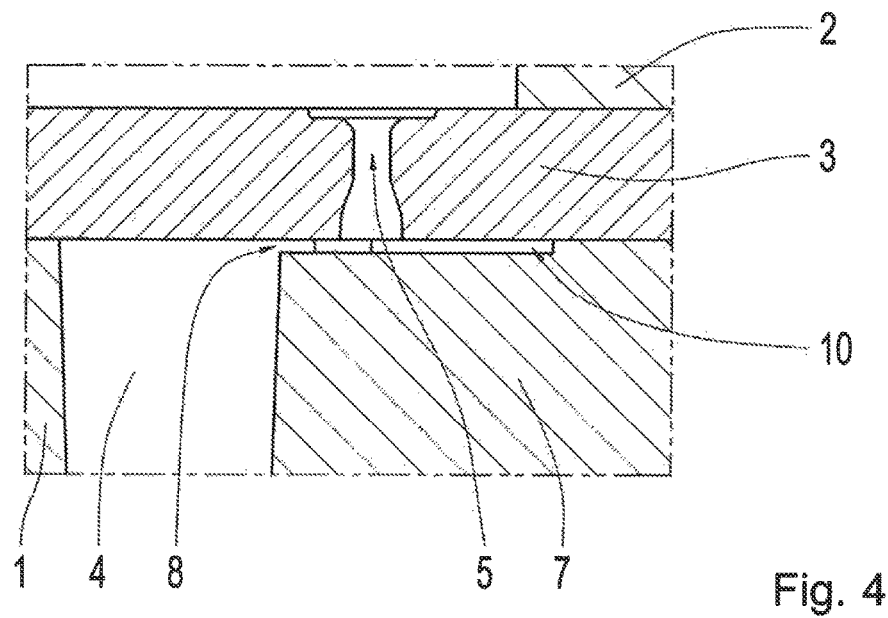
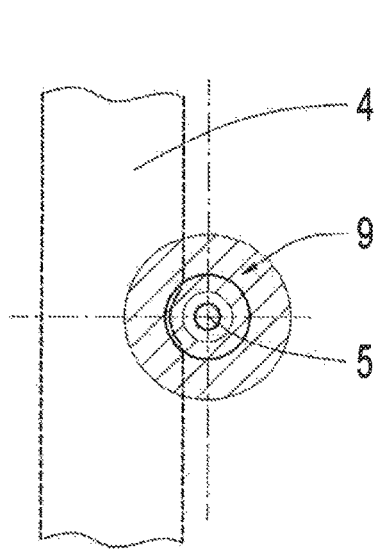
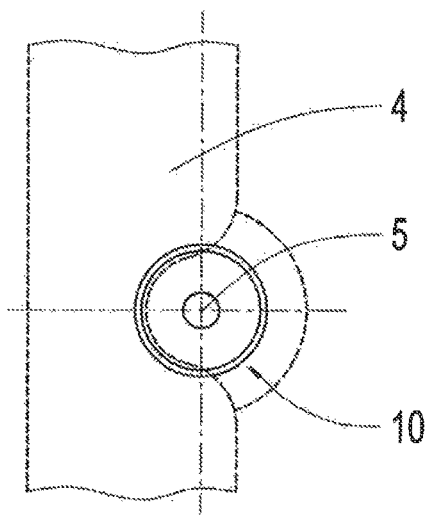

HYDRAULIC CONTROL SYSTEM

FIELD OF THE INVENTION

The present invention relates generally to a hydraulic control unit with at least one housing lower side and one housing upper side.

BACKGROUND

Hydraulic controls, such as hydraulic control units or the like for transmissions, are generally known from vehicle technology. The hydraulic control device includes a housing lower side and a housing upper side, which are separated from each other by an intermediate plate. Both the housing lower side and the housing upper side feature a plural number of hydraulic supply or flow channels, which are connected through the intermediate plate by means of an allocated aperture or the like. The apertures feature a small diameter, and are therefore provided with a filter sieve to protect the apertures from contamination. Thereby, for example, flat or cylindrical filters can be installed in front of the apertures. So-called "cartridge-solutions" are also known, with which a structural unit made of an aperture and a sieve are pressed into the housing. However, such solutions cannot be installed in the intermediate plate.

It has been shown that the use of separate filter elements as aperture protection in the hydraulic control device not only involve complicated assembly, but are also cost-intensive. Furthermore, maintenance costs are high and the replacement of filters is labor-intensive.

SUMMARY OF THE INVENTION

The present invention is subject to the task of proposing a hydraulic control device with aperture protection, which is cost-effective and maintenance-free.

Thus, a hydraulic control device for a transmission (for example, an automatic transmission) with at least one housing lower side (for example, as a valve housing) and one housing upper side (for example, as a channel plate or a valve plate), is proposed, whereas the housing lower side and the housing upper side are separated from each other by means of an intermediate plate (for example, an intermediate sheet). The housing lower side and the housing upper side form, among other things, hydraulic supply channel sections. Each of the supply channel sections is connected in the intermediate plate by means of an aperture. For aperture protection, at the inlet area of the aperture, at least one recess or the like with a predetermined depth is provided for bounding the inlet cross-section.

In this manner, aperture protection for smaller apertures (for example, apertures with a diameter smaller than one millimeter) for a hydraulic control device (such as a hydraulic control unit of a transmission) is realized. Advantageously, the aperture protection is realized solely by recesses provided during manufacturing, such that an additional filter can be omitted, and no subsequent machining is necessary. Depending on the flow direction, the recess at the inlet area of the aperture can be provided in the area of the housing lower side or the valve housing, or in the housing upper side or the valve plate.

With the proposed hydraulic control device, the bounding of the inlet cross-section of the aperture is realized by the fact that the recess of the aperture in the intermediate plate is allocated in the area of a wall of the housing lower side or the housing upper side. Thus, the inlet cross-section is bounded, on one side, by the depth of the recess or the recess wall and, on the other side, by the facing housing wall or by the intermediate plate itself. Thereby, particles included in the fluid are able to arrive in the inlet of the aperture only if they are smaller than the gap bounded by the intermediate plate and the housing wall. Accordingly, the blocking of the aperture in the intermediate plate can be ruled out.

With a first exemplary embodiment of the invention, it may be provided that the recess is provided as an impression with a predetermined depth at the inlet of the aperture on the intermediate plate, such that the inlet cross-section is bounded, on one side, by the depth of the impression on the intermediate plate or the intermediate sheet and, on the other side, by the housing wall turned towards the inlet area. Thus, the aperture is protected from dirt particles or the like by the impression or the like, with a smaller depth than that of the aperture diameter in the intermediate sheet or in the intermediate plate. Furthermore, there is the advantage that no machining is necessary on the housing parts, since the impression is provided during the manufacturing of the intermediate sheet or the intermediate plate.

An additional exemplary embodiment of the invention may be provided, with which the recess is designed as a milled groove or the like, with a predetermined depth, in the area of the inlet of the aperture on the housing lower side or the valve housing, or the housing upper side or the valve plate, depending on the flow direction, such that the inlet cross-section is bounded, on one side, by the depth of the milled groove and, on the other side, by the intermediate plate in the inlet area of the aperture. In this exemplary embodiment, the valve housing is accordingly machined below the aperture, or the valve plate is accordingly machined above the aperture. This results in the advantage that the depth of the recess or the milled groove can be designed with a certain tolerance, and can be precisely adjusted to the aperture diameter. Depending on the flow direction, this exemplary embodiment can be realized on two halves of the housing, or on the housing upper side or the housing lower side.

The proposed hydraulic control device may be preferably used as a hydraulic switching device or the like in a transmission, since, with this application, a plural number of apertures are provided in the intermediate plate or in the intermediate sheet, and can be protected with the aperture protection in accordance with exemplary aspects of the invention in the most simple manner.

BRIEF DESCRIPTION OF THE DRAWINGS

The present invention is further described below with reference to the drawings. The following is shown:

FIG. 3 a schematic top view of the first exemplary embodiment in accordance with FIG. 2;

FIG. 4 a sectional detailed view of a second exemplary embodiment of the hydraulic control device; and FIG. 5 a schematic top view of the second exemplary embodiment in accordance with FIG. 4.

DETAILED DESCRIPTION

Figure 1:
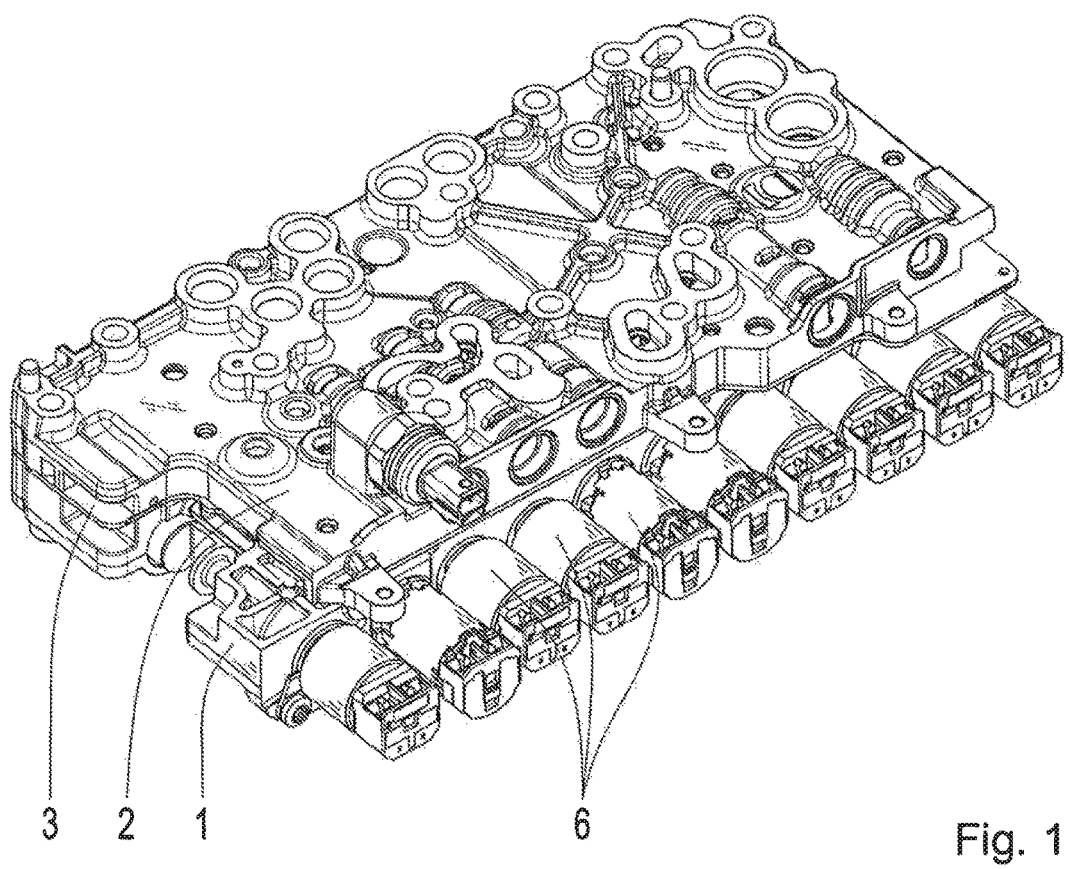
FIG. 1 a schematic three-dimensional view of an exemplary hydraulic control device or a hydraulic control unit.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1 through 5 show various embodiments of a hydraulic control device in accordance exemplary aspects of with the invention, such as a hydraulic control unit that is provided in transmissions, particularly automatic transmissions.

The hydraulic control device comprises at least one housing lower side 1 designed as a valve housing and a housing upper side 2 designed as a valve plate, which are separated from each other by an intermediate plate 3 designed as an intermediate sheet. In each case, the housing lower side 1 and the housing upper side 2 form at least one hydraulic supply channel section 4, which hydraulic supply channels are connected to each other in the intermediate plate 3 by means of an aperture 5. In accordance with exemplary aspects of the invention, it is provided that, at the inlet area of the aperture 5, at least one recess with a predetermined depth for bounding the inlet cross-section of the aperture 5 is provided.

FIG. 1 shows an overall view of the hydraulic control device or the hydraulic control unit. At the housing lower side 1, several pressure regulators 6 are connected, in order to supply corresponding actuators of the transmission with hydraulic fluid.

Independent of the various exemplary embodiments, it is provided that the aperture 5 is arranged in the intermediate plate 3 in such a manner that at least the inlet of the aperture 5 is allocated to a housing wall 7 of the housing lower side 1 or the housing upper side 2, such that the inlet cross-section is bounded by a gap 8 between the intermediate plate 3 and the housing wall 7. In this manner, aperture protection is realized without the use of a filter, as any larger particles contained in the hydraulic fluid are not able to pass through the gap, and thus the aperture 5 cannot be clogged.

Figure 2:
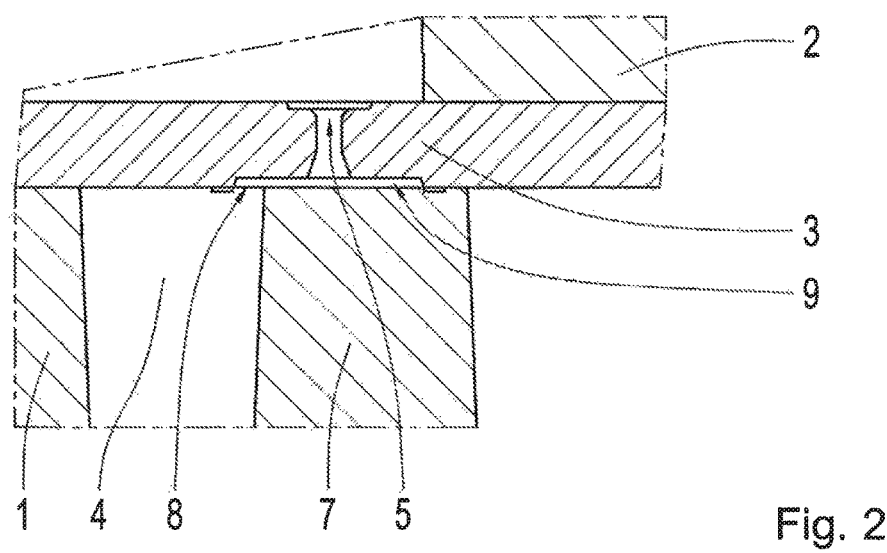
FIG. 2 a sectional detailed view of a first exemplary embodiment of the hydraulic control device.

FIGS. 2 and 3 show different views of a first exemplary embodiment of the hydraulic control device or the hydraulic control unit. With this first embodiment, the recess is provided as an impression 9 with a predetermined depth at the inlet of the aperture 5 on the intermediate plate 3, such that the inlet cross-section is bounded, on one side, by the depth of the impression 9 and, on the other side, by the housing wall 7 turned towards the inlet area. The depth of the impression 9 is less than that of the aperture diameter, in order to realize the aperture protection. As can be seen in FIG. 3 (for example), the impression 9 is formed to be approximately circular. The diameter of the impression 9 is larger than that of the aperture diameter. FIG. 3 shows a top view of the intermediate plate 3 without the upper housing 2, with the supply channel section 4 in the lower housing part 1.

FIGS. 4 and 5 show different views of a second exemplary embodiment of the invention. With the second exemplary embodiment, the recess is designed as a milled groove 10 or the like, with a predetermined depth, in the area of the inlet of the aperture 5 on the housing lower side 1 or the housing upper side 2, such that the inlet cross-section is bounded, on one side, by the depth of the milled groove 10 and, on the other side, by the intermediate plate 3 in the inlet area of the aperture 5. The gap 8A formed between the milled groove 10 and the intermediate plate 3 realizes the aperture protection for the aperture 5. The depth of the milled groove 10 is less than that of the aperture diameter, such that particles in the hydraulic fluid that are larger than those in the gap 8A are not able to arrive in the aperture 5. As shown in FIG. 5, the milled groove 10 in the inlet area of the aperture 5 is designed in approximately segmented circular shape. FIG. 5 shows a top view of the housing lower side 1 with the supply channel section 4, without the upper housing part 2.

The depth of the impression 9 and the milled groove 10 may vary depending on the aperture diameter. For example, a depth of approximately two tenths (0.2) mm is used.

The illustrated exemplary embodiments show, by way of example, a valve housing as the housing lower side 1, a valve plate or a channel as the housing upper side 2 and an intermediate sheet of the hydraulic control unit as the intermediate plate 3, as provided in a transmission housing.

Modifications and variations can be made to the embodiments illustrated or described herein without departing from the scope and spirit of the invention as set forth in the appended claims.

REFERENCE SIGNS

1 Housing lower side or valve housing
2 Housing upper side or valve plate
3 Intermediate plate or sheet
4 Supply channel section
5 Aperture
6 Pressure regulator
7 Housing wall
8 Gap
9 Recess designed as an impression
10 Recess designed as a milled groove

The invention claimed is:

1. A hydraulic control device for a transmission, comprising: a valve housing; a valve plate; an intermediate plate vertically separating the valve housing and the valve plate from each other; and a plurality of pressure regulator valves positioned at the valve housing, the plurality of pressure regulator valves configured to supply corresponding actuators of the transmission with a hydraulic fluid, wherein the valve housing and the valve plate each form a hydraulic supply channel section, which are connected through the intermediate plate by an aperture, wherein the aperture has an inlet and at least one recess with a predetermined depth bounding a cross-section of the inlet, wherein the aperture is positioned in the intermediate plate such that at least the inlet of the aperture is vertically aligned with a wall of the valve housing, and wherein the cross-section of the inlet is positioned at a gap formed between the intermediate plate and the wall of the valve housing.

2. The hydraulic control device of claim 1, wherein the recess is an impression with the predetermined depth at the inlet of the aperture on the intermediate plate, the impression forming the gap such that the cross-section of the inlet is separated from the wall of the valve housing by the predetermined depth.

3. The hydraulic control device of claim 2, wherein the predetermined depth of the impression is less than a diameter of the aperture.

4. The hydraulic control device according to claim 3, wherein the impression is approximately circular.

5. The hydraulic control device according to claim 4, wherein a diameter of the impression is larger than the diameter of the aperture.

6. A hydraulic control device for a transmission, comprising: a valve housing; a valve plate; an intermediate plate vertically separating the valve housing and the valve plate from each other; and a plurality of pressure regulator valves positioned at the valve housing, the plurality pressure regulator valves configured to supply corresponding actuators of the transmission with a hydraulic fluid, wherein the valve housing and the valve plate each form a hydraulic supply channel section, which are connected through the intermediate plate by an aperture, wherein the aperture has an inlet, wherein the aperture is positioned in the intermediate plate such that at least the inlet of the aperture is vertically aligned with a wall of the valve housing, and wherein a cross-section of the inlet is positioned at a gap formed between the intermediate plate and the wall of the valve housing, the gap being formed by a recess with a predetermined depth in the wall of the valve housing.

7. The hydraulic control device of claim 6, wherein the recess is a milled groove with a predetermined depth positioned at the inlet of the aperture on the wall of the valve housing, the milled groove forms the gap such that the cross-section of the inlet is separated from the wall of the valve housing by the predetermined depth.

8. The hydraulic control device of claim 7, characterized in that the predetermined depth of the milled groove is less than a diameter of the aperture.

9. The hydraulic control device of claim 7, wherein the milled groove has an approximately segmented circular shape at the inlet of the aperture.

* * * * *